US010135742B2

(12) United States Patent
Liu

(10) Patent No.: US 10,135,742 B2
(45) Date of Patent: Nov. 20, 2018

(54) DATA TRANSMISSION APPARATUS AND METHOD

(71) Applicant: Huawei Technologies Co., Ltd., Shenzhen, Guangdong (CN)

(72) Inventor: Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 15/184,689

(22) Filed: Jun. 16, 2016

(65) Prior Publication Data

US 2016/0294708 A1 Oct. 6, 2016

Related U.S. Application Data

(63) Continuation of application No. PCT/CN2013/089696, filed on Dec. 17, 2013.

(51) Int. Cl.
*H04L 12/853* (2013.01)
*H04L 12/801* (2013.01)
(Continued)

(52) U.S. Cl.
CPC ........ *H04L 47/2416* (2013.01); *H04L 1/0002* (2013.01); *H04L 1/1825* (2013.01);
(Continued)

(58) Field of Classification Search
None
See application file for complete search history.

(56) References Cited

U.S. PATENT DOCUMENTS 8,238,313 B2    8/2012  Maltsev et al.
2010/0067401 A1  3/2010  Medvedev et al.
(Continued)

FOREIGN PATENT DOCUMENTS

CN    101034955 A    9/2007
CN    101102312 A    1/2008
(Continued)

OTHER PUBLICATIONS

"Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension", IEEE Std 802.15.3c, Oct. 12, 2009, 203 pages.
(Continued)

*Primary Examiner* — Jason E Mattis
*Assistant Examiner* — Hong Shao

(57) ABSTRACT

Embodiments of the present invention provide a data transmission apparatus and method. The data transmission apparatus includes: a processor, configured to, record a link quality indication value corresponding to received data and add 1 to a count value, if the data is received within a preset period of time; if it is learned by comparison that the count value is not less than a quantity N of pieces of data allowed to be transmitted in a current period, calculate an average value of link quality indication values; and compare the average value with a threshold to determine a quantity of pieces of data allowed to be transmitted in a next period The apparatus also includes a transceiver, configured to reply with a periodicity acknowledgment frame that carries the quantity of pieces of data allowed to be transmitted in the next period.

8 Claims, 7 Drawing Sheets

(51) Int. Cl.
*H04L 12/807* (2013.01)
*H04L 1/20* (2006.01)
*H04L 1/16* (2006.01)
*H04L 1/00* (2006.01)
*H04L 1/18* (2006.01)

(52) U.S. Cl.
CPC .............. *H04L 1/201* (2013.01); *H04L 1/203* (2013.01); *H04L 47/27* (2013.01); *H04L 47/29* (2013.01); *H04L 1/1671* (2013.01)

(56) References Cited

U.S. PATENT DOCUMENTS

| | | | |
|---|---|---|---|
| 2012/0250495 A1 | 10/2012 | Park et al. | |
| 2014/0072059 A1* | 3/2014 | Krishnan | G01D 4/002 375/257 |
| 2014/0169485 A1* | 6/2014 | Vijayasankar | H04B 3/542 375/257 |

FOREIGN PATENT DOCUMENTS

| | | |
|---|---|---|
| CN | 101170381 A | 4/2008 |
| CN | 101621829 A | 1/2010 |
| CN | 101702824 A | 5/2010 |
| CN | 102694731 A | 9/2012 |
| EP | 2088731 B1 | 9/2017 |
| WO | 2008037855 A1 | 4/2008 |

OTHER PUBLICATIONS

Jong-In Lee, "Channel Adaptive ACK Mechanism in IEEE 802.15.3 Wireless Personal Area Networks", Broadband Communication Lab., Aug. 28, 2008, 17 pages.

Jong-In Lee et al., "A Channel Adaptive ACK Mechanism in High Rate Wireless Personal Area Networks", Wireless Pers Commun (2012), p. 473-488.

Ryoko Matsuo et al., "MAC efficiency enhancement with ACK/NACK and AGC pilot signal adaptation mechanism in millimeter-wave communication systems", IEEE, 2010, 5 pages.

Mohammad Hossien Yaghmaee et al., "Priority Based Congestion Control and Partial Reliability Guaranty Protocol for Wireless Multimedia Sensor Networks", 1 page.

* cited by examiner

DATA TRANSMISSION APPARATUS AND METHOD

CROSS-REFERENCE TO RELATED APPLICATIONS

This application is a continuation of International Patent Application No. PCT/CN2013/089696, filed on Dec. 17, 2013, which is incorporated herein by reference in its entirety.

TECHNICAL FIELD

Embodiments of the present invention relate to communications technologies, and in particular, to a data transmission apparatus and method.

BACKGROUND

A wireless multimedia sensor network (WMSN for short) is a distributed sensor network with information storage, data computing, and communication capabilities, and consists of various sensor nodes, where the sensor nodes are video, audio, and image sensor nodes and the like that are added to a wireless sensor network and collect richer information. Broadly speaking, the wireless multimedia sensor network covers a traditional scalar sensor network, a video sensor network, an image sensor network, a visual sensor network, and a mixture of various sensor node networks, such as video, audio, and image sensor node networks. The wireless multimedia sensor network has higher requirements for real-time and reliable multimedia data transmission.

An Acknowledge (ACK) mechanism has greater impact on media access control (MAC) layer data sending and receiving efficiency and network throughput; therefore, in the known solutions, a channel state situation is determined by comparing a calculated frame error rate with a frame error rate threshold, and then sending an acknowledgment frame (a NO-ACK mechanism) or sending an immediate acknowledgment frame (an Imm-ACK mechanism) is adaptively selected according to a channel state. After sending a data frame, a source device updates a current frame error rate of a receiving device according to a received acknowledgment frame. Then, a currently calculated frame error rate is compared with a preset frame error rate threshold. If the current frame error rate is less than the threshold, it indicates that channel quality is good, and the source device selects the NO-ACK mechanism to process a to-be-sent data frame. If the current frame error rate is not less than the threshold, the source device selects the Imm-ACK mechanism to process a to-be-sent data frame. However, channel state measurement by calculating an overall frame error rate does not take an unexpected channel interference situation into consideration, and cannot reflect a channel state in real time.

SUMMARY

Embodiments of the present invention provide a data transmission apparatus and method to resolve a problem in the prior art that selection of an ACK acknowledgment mechanism cannot reflect a channel state in real time.

According to a first aspect, an embodiment of the present invention provides a data transmission apparatus, including:

a preprocessing module, configured to, if data is received within a preset period of time, record a link quality indication value LQI corresponding to the data, and perform incremental processing by adding 1 to a count value, where the count value is used to count a quantity of pieces of received data;

a processing module, configured to, if it is learned by means of comparison that the count value is not less than a quantity N of pieces of data allowed to be transmitted in a current period, calculate an average value $\overline{LQI}$ of link quality indication values corresponding to all data received within the current period, where the processing module is further configured to compare the average value $\overline{LQI}$ with a threshold to determine a quantity of pieces of data allowed to be transmitted in a next period; and a reply module, configured to reply with a periodicity acknowledgment frame, where the periodicity acknowledgment frame carries the quantity of pieces of data allowed to be transmitted in the next period.

With reference to the first aspect, in a first possible implementation manner of the first aspect, the reply module is further configured to:

if the received data is retransmission data, immediately reply with an acknowledgment frame.

With reference to the first aspect, in a second possible implementation manner of the first aspect, the preprocessing module is further configured to:

if no data is received within the preset time, which is considered that a piece of null data is received within the preset time, perform incremental processing by adding 1 to the count value, where a link quality indication value of the null data is a preset link quality indication critical value.

With reference to the first aspect, or the first and the second possible implementation manners of the first aspect, in a third possible implementation manner of the first aspect, the processing module is specifically configured to:

when the average value $\overline{LQI}$ is less than or equal to a lower threshold $LQI_{min}$, reduce the quantity of pieces of data allowed to be transmitted in the next period, where the quantity of pieces of data is not less than a first preset value $N_{min}$; or when the average value $\overline{LQI}$ is greater than or equal to an upper threshold $LQI_{max}$, increase the quantity of pieces of data allowed to be transmitted in the next period, where the quantity of pieces of data is not greater than a second preset value $N_{max}$; or when the average value $\overline{LQI}$ is greater than a lower threshold $LQI_{min}$ and less than an upper threshold $LQI_{max}$, determine that the quantity of pieces of data allowed to be transmitted in the next period is the value N of the quantity of pieces of data allowed to be transmitted in the current period.

With reference to the third possible implementation manner of the first aspect, in a fourth possible implementation manner of the first aspect, the processing module is further specifically configured to:

when the average value $\overline{LQI}$ is less than or equal to the lower threshold $LQI_{min}$, if $N*(1-k)$ is less than the first preset value $N_{min}$, determine that the quantity of pieces of data allowed to be transmitted in the next period is the first preset value $N_{min}$, or if $N*(1-k)$ is greater than or equal to the first preset value $N_{min}$, round $N*(1-k)$, where k is $(LQI_{min}-\overline{LQI})/LQI_{min}$.

With reference to the third possible implementation manner of the first aspect, in a fifth possible implementation manner of the first aspect, the processing module is further specifically configured to:

when the average value $\overline{LQI}$ is greater than or equal to the upper threshold $LQI_{max}$, if $N*(1+k)$ is greater than the second preset value $N_{max}$, determine that the quantity of pieces of data allowed to be transmitted in the next period is the second preset value $N_{max}$, or if $N*(1+k)$ is less than or equal to the second preset value $N_{max}$, round $N*(1+k)$, where k is $(\overline{LQI}-LQI_{max})/LQI_{max}$.

According to a second aspect, an embodiment of the present invention provides a data transmission method, including:

if data is received within a preset period of time, recording a link quality indication value LQI corresponding to the data, and performing incremental processing by adding 1 to a count value, where the count value is used to count a quantity of pieces of received data;

if it is learned by means of comparison that the count value is not less than a quantity N of pieces of data allowed to be transmitted in a current period, calculating an average value $\overline{LQI}$ of link quality indication values corresponding to all data received within the current period;

comparing the average value $\overline{LQI}$ with a threshold to determine a quantity of pieces of data allowed to be transmitted in a next period; and replying with a periodicity acknowledgment frame, where the periodicity acknowledgment frame carries the quantity of pieces of data allowed to be transmitted in the next period.

With reference to the second aspect, in a first possible implementation manner of the second aspect, the method further includes: if the received data is retransmission data, immediately replying with an acknowledgment frame.

With reference to the second aspect, in a second possible implementation manner of the second aspect, the method further includes:

if no data is received within the preset time, which is considered that a piece of null data is received within the preset time, performing incremental processing by adding 1 to the count value, where a link quality indication value of the null data is a preset link quality indication critical value.

With reference to the second aspect, or the first and the second possible implementation manners of the second aspect, in a third possible implementation manner of the second aspect, the comparing the average value $\overline{LQI}$ with a threshold to determine a quantity of pieces of data allowed to be transmitted in a next period includes:

reducing, when the average value $\overline{LQI}$ is less than or equal to a lower threshold $LQI_{min}$, the quantity of pieces of data allowed to be transmitted in the next period, where the quantity of pieces of data is not less than a first preset value $N_{min}$; or increasing, when the average value $\overline{LQI}$ is greater than or equal to an upper threshold $LQI_{max}$, the quantity of pieces of data allowed to be transmitted in the next period, where the quantity of pieces of data is not greater than a second preset value $N_{max}$; or determining, when the average value $\overline{LQI}$ is greater than a lower threshold $LQI_{min}$ and less than the an threshold $LQI_{max}$, that the quantity of pieces of data allowed to be transmitted in the next period is the value N of the quantity of pieces of data allowed to be transmitted in the current period.

With reference to the third possible implementation manner of the second aspect, in a fourth possible implementation manner of the second aspect, the reducing, when the average value $\overline{LQI}$ is less than or equal to a lower threshold $LQI_{min}$, the quantity of pieces of data allowed to be transmitted in the next period, where the quantity of pieces of data is not less than a first preset value $N_{min}$ includes:

when the average value $\overline{LQI}$ is less than or equal to the lower threshold $LQI_{min}$, if $N*(1-k)$ is less than the first preset value $N_{min}$, determining that the quantity of pieces of data allowed to be transmitted in the next period is the first preset value $N_{min}$, or if $N*(1-k)$ is greater than or equal to the first preset value $N_{min}$, rounding $N*(1-k)$, where k is $(LQI_{min}-\overline{LQI})/LQI_{min}$.

With reference to the third possible implementation manner of the second aspect, in a fifth possible implementation manner of the second aspect, the increasing, when the average value $\overline{LQI}$ is greater than or equal to an upper threshold $LQI_{max}$, the quantity of pieces of data allowed to be transmitted in the next period, where the quantity of pieces of data is not greater than a second preset value $N_{max}$ includes:

when the average value $\overline{LQI}$ is greater than or equal to the upper threshold $LQI_{max}$, if $N*(1+k)$ is greater than the second preset value $N_{max}$, determining that the quantity of pieces of data allowed to be transmitted in the next period is the second preset value $N_{max}$, or if $N*(1+k)$ is less than or equal to the second preset value $N_{max}$, rounding $N*(1+k)$, where k is $(\overline{LQI}-LQI_{max})/LQI_{max}$.

According to a third aspect, an embodiment of the present invention provides a data transmission device, including:

a processor and a memory, where the memory stores an execution instruction; when the data transmission device runs, the processor communicates with the memory, and the processor executes the execution instruction so that the data transmission device executes the method in the second aspect, or any one of the first to fifth possible implementation manners of the second aspect.

According to the data transmission apparatus and method in the embodiments of the present invention, if data is received within a preset period of time, a link quality indication value LQI corresponding to the data is recorded, and incremental processing is performed by adding 1 to a count value, where the count value is used to count a quantity of pieces of received data; if it is learned by means of comparison that the count value is not less than a quantity N of pieces of data allowed to be transmitted in a current period, an average value $\overline{LQI}$ of link quality indication values corresponding to all data received within the current period is calculated; the average value $\overline{LQI}$ is compared with a threshold to determine a quantity of pieces of data allowed to be transmitted in a next period; and a periodicity acknowledgment frame is returned, where the periodicity acknowledgment frame carries the quantity of pieces of data allowed to be transmitted in the next period. A real-time channel detection mechanism is formed by comparing and analyzing the average value of the LQI and the threshold; the quantity of pieces of data allowed to be transmitted in the next period is adaptively adjusted to ensure data reliability; and by means of replying with the periodicity acknowledgment frame, exchanges of acknowledgment frames are reduced, which reduces overheads required for the exchanges of acknowledgment frames, reduces a waiting delay of data, improves network throughput and data sending and receiving efficiency, and meets a real-time requirement of multimedia data, especially, video data.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

There are more types and a higher QoS requirement of data transmitted by a device in a multimedia sensor network than those in a traditional wireless sensor network, which imposes a higher requirement for data service quality; therefore, with respect to such a characteristic of the multimedia sensor network, a solution of a data transmission apparatus in the embodiments of the present invention may be used to improve network throughput.

Figure 1:
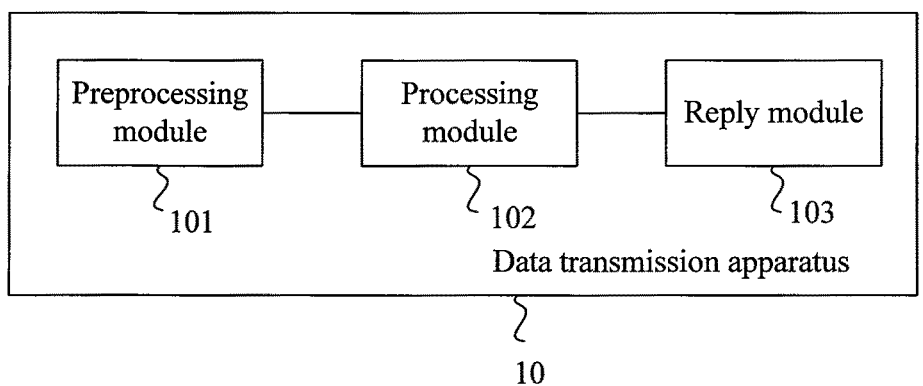
FIG. 1 is a schematic structural diagram of Embodiment 1 of a data transmission apparatus according to the present invention.
Figure 2:
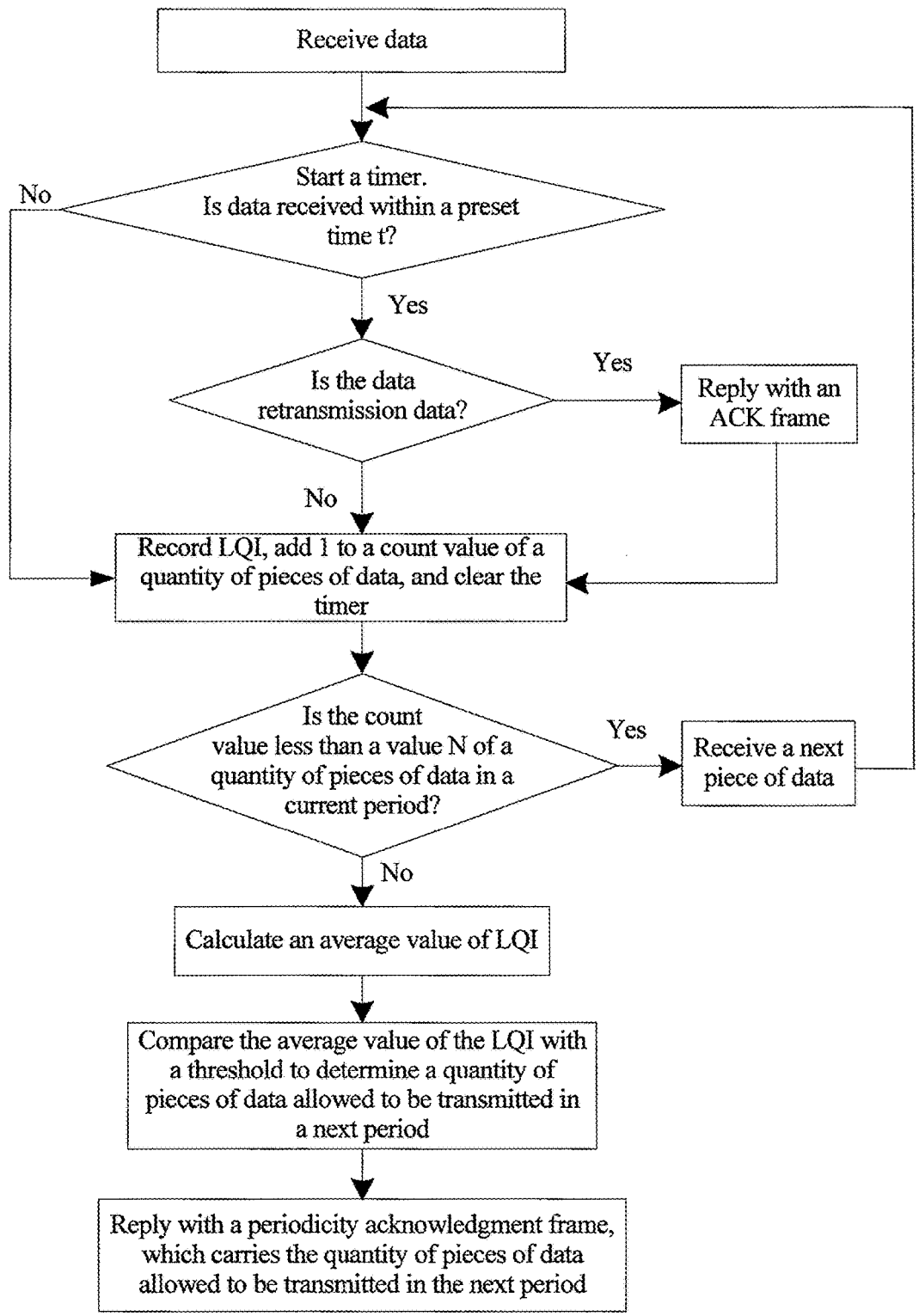
FIG. 2 is a flowchart of Embodiment 1 of a data transmission apparatus according to the present invention.

FIG. 1 is a schematic structural diagram of Embodiment 1 of a data transmission apparatus according to the present invention; and FIG. 2 is a flowchart of Embodiment 1 of the data transmission apparatus according to the present invention. This embodiment is executed by the data transmission apparatus, where the data transmission apparatus may be implemented by using software and/or hardware. The solution in this embodiment may be applied to a wireless multimedia sensor network. As shown in FIG. 1, a data transmission apparatus 10 in this embodiment may include: a preprocessing module 101, a processing module 102, and a reply module 103, where the preprocessing module 101 is configured to, if data is received within a preset period of time, record a link quality indication value LQI corresponding to the data, and perform incremental processing by adding 1 to a count value, where the count value is used to count a quantity of pieces of received data; the processing module 102 is configured to, if it is learned by means of comparison that the count value is not less than a quantity N of pieces of data allowed to be transmitted in a current period, calculate an average value $\overline{LQI}$ of link quality indication values corresponding to all data received within the current period, where the processing module 102 is further configured to compare the average value $\overline{LQI}$ with a threshold to determine a quantity of pieces of data allowed to be transmitted in a next period; and the reply module 103 is configured to reply with a periodicity acknowledgment frame, where the periodicity acknowledgment frame carries the quantity of pieces of data allowed to be transmitted in the next period.

Optionally, the reply module 103 is further configured to:

if the received data is retransmission data, immediately reply with an acknowledgment frame.

Optionally, the preprocessing module 101 is further configured to:

if no data is received within the preset time, which is considered that a piece of null data is received within the preset time, perform incremental processing by adding 1 to the count value, where a link quality indication value of the null data is a preset link quality indication critical value.

Specifically, the data transmission apparatus in this embodiment may be a receiving device in the multimedia sensor network. The preset link quality indication critical value, a quantity N of pieces of data allowed to be transmitted in an initialization period, and a preset period of time t, namely, a timeout interval of a timer are configured when the network is initialized. As shown in FIG. 2, after a data transmission period begins, a timer of the preprocessing module 101 of the data transmission apparatus 10, that is, the receiving device starts timing, and it is determined whether data is received within the preset time t; if no data is received, it is considered that a piece of null data is received, an LQI value of the data is recorded as the preset link quality indication critical value, incremental processing is performed by adding 1 to the count value of the quantity of pieces of data, and the timer is cleared; or if data is received within the preset time t, when the received data is retransmission data, the reply module 103 immediately replies with an ACK frame, the preprocessing module 101 records LQI of the data, and performs incremental processing by adding 1 to the count value of the quantity of pieces of data, and the timer is cleared, or when the received data is non-retransmission data, the preprocessing module 101 records LQI of the data, and performs incremental processing by adding 1 to the count value of the quantity of pieces of data, and the timer is cleared. If the count value is less than the value N of the quantity of pieces of data allowed to be transmitted in the current period, a next piece of data continues to be received; after counting is performed again, the count value is compared. If the count value of the quantity of pieces of data is equal to the value N of the quantity of pieces of data allowed to be transmitted in the current period, the processing module 102 calculates the average value $\overline{LQI}$ of the LQI of the data received within the current period, and compares $\overline{LQI}$ with the threshold, so that the quantity of pieces of data allowed to be transmitted in the next period is adaptively adjusted. After the quantity of pieces of data allowed to be transmitted in the next period is determined, the reply module 103 constructs a periodicity acknowledgment frame Pec-ACK and replies with the Pec-ACK for confirmation, and feeds back the quantity of pieces of data allowed to be transmitted in the next period to a source device by using the Pec-ACK frame; after receiving the Pec-ACK frame, the source device starts to send data of the next period.

In this embodiment, if data is received within a preset period of time, a link quality indication value LQI corresponding to the data is recorded, and incremental processing is performed by adding 1 to a count value, where the count value is used to count a quantity of pieces of received data; if it is learned by means of comparison that the count value is not less than a quantity N of pieces of data allowed to be transmitted in a current period, an average value $\overline{LQI}$ of link quality indication values corresponding to all data received within the current period is calculated; the average value $\overline{LQI}$ is compared with a threshold to determine a quantity of pieces of data allowed to be transmitted in a next period; and a periodicity acknowledgment frame is returned, where the periodicity acknowledgment frame carries the quantity of pieces of data allowed to be transmitted in the next period. A real-time channel detection mechanism is formed by comparing and analyzing the average value of the LQI and the threshold; the quantity of pieces of data allowed to be transmitted in the next period is adaptively adjusted to ensure data reliability; and by means of replying with the periodicity acknowledgment frame, exchanges of acknowledgment frames are reduced, which reduces overheads required for the exchanges of acknowledgment frames, reduces a waiting delay of data, improves network throughput and data sending and receiving efficiency, and meets a real-time requirement of multimedia data, especially, video data.

Figure 3A:
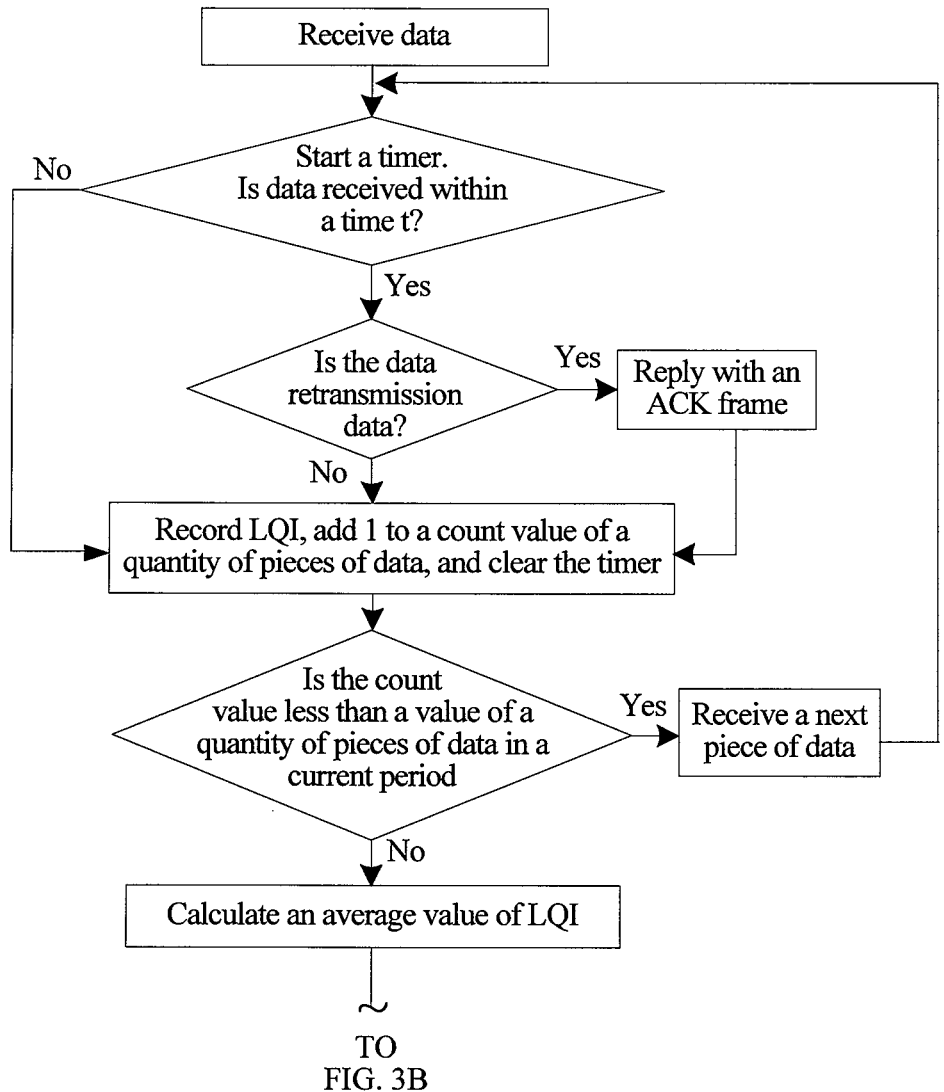
FIG. 3A and FIG. 3B are a flowchart of Embodiment 2 of a data transmission apparatus according to the present invention.
Figure 3B:
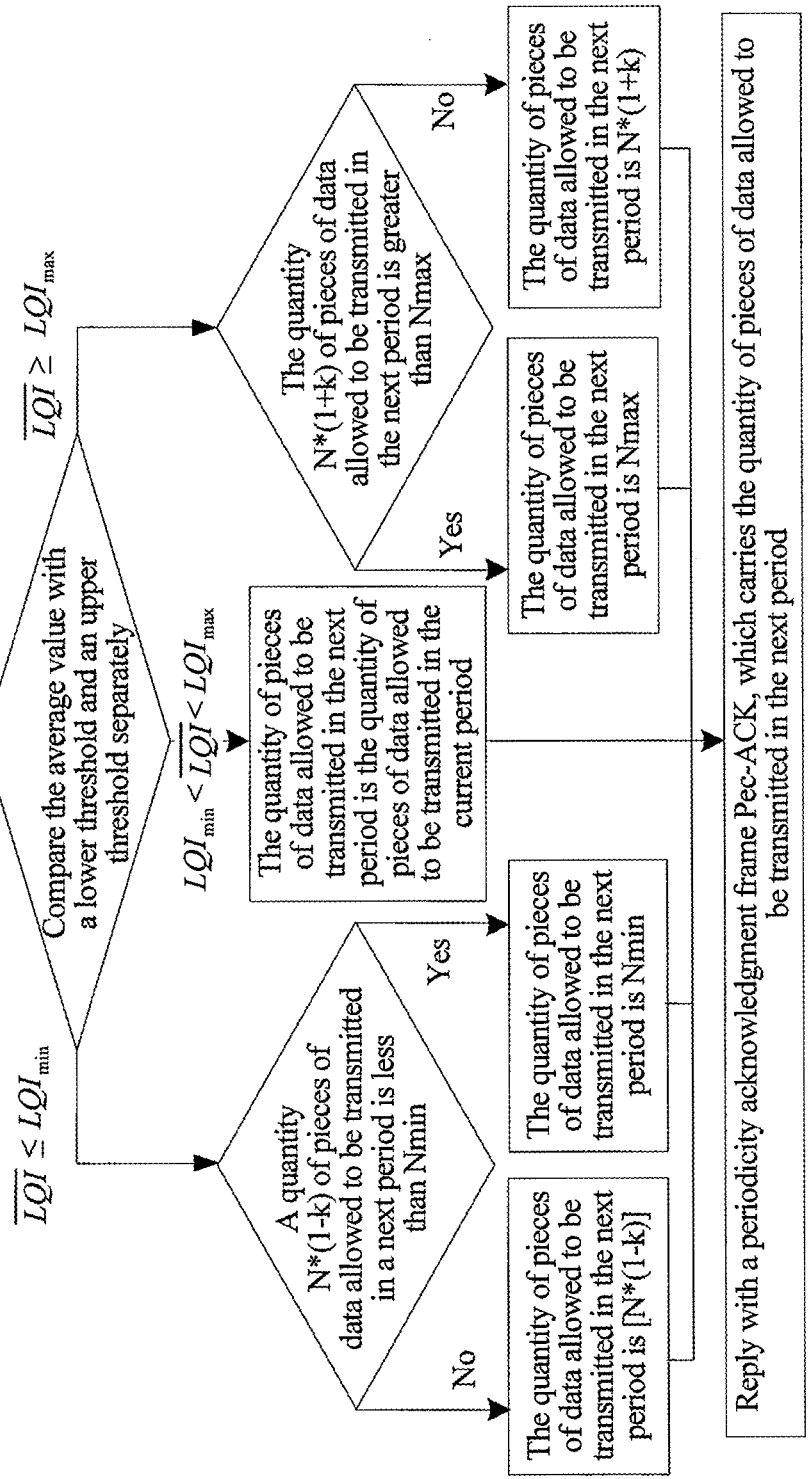
Figure 4:
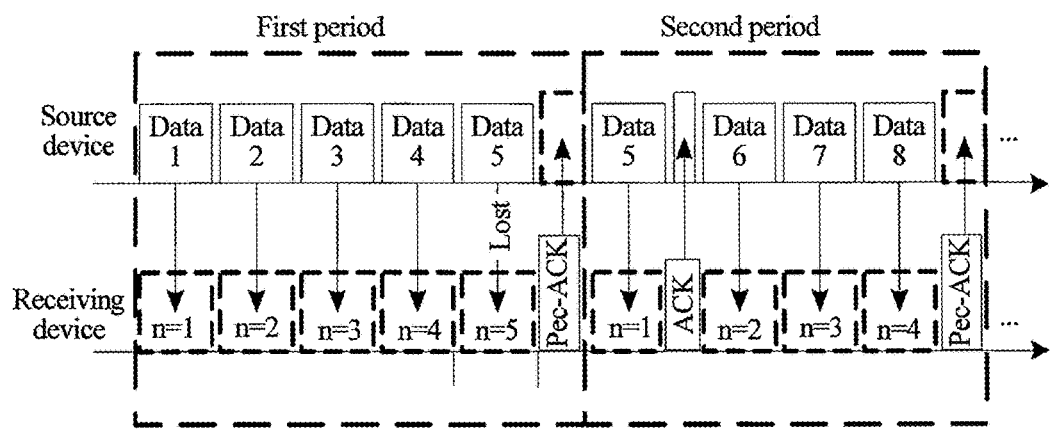
FIG. 4 is schematic diagram 1 of a data frame exchange of Embodiment 2 of a data transmission apparatus according to the present invention.
Figure 5:
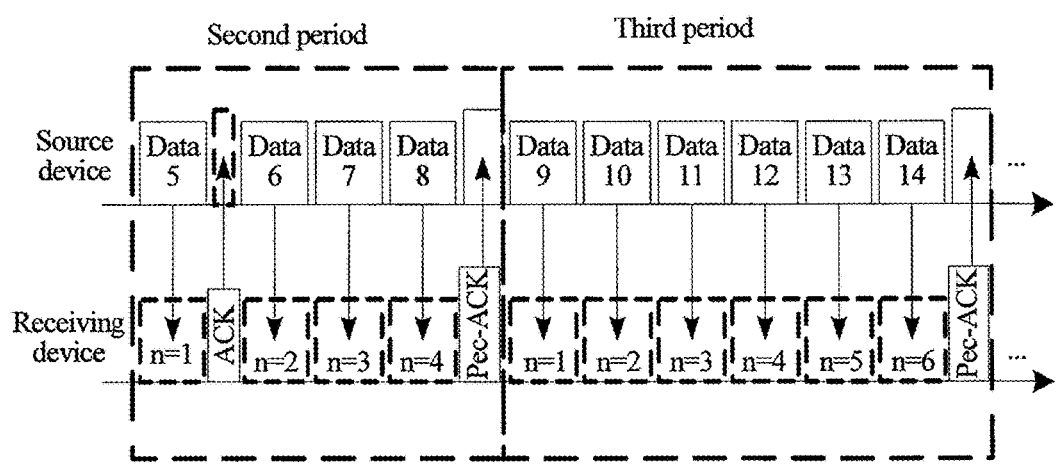
FIG. 5 is schematic diagram 2 of a data frame exchange of Embodiment 2 of a data transmission apparatus according to the present invention.

FIG. 3A and FIG. 3B are a flowchart of Embodiment 2 of a data transmission apparatus according to the present invention; FIG. 4 is schematic diagram 1 of a data frame exchange of Embodiment 2 of the data transmission apparatus according to the present invention; FIG. 5 is schematic diagram 2 of a data frame exchange of Embodiment 2 of the data transmission apparatus according to the present invention. On the basis of the apparatus embodiment shown in FIG. 1, the processing module 102 in this embodiment is specifically configured to:

when the average value $\overline{LQI}$ is less than or equal to a lower threshold $LQI_{min}$, reduce the quantity of pieces of data allowed to be transmitted in the next period, where the quantity of pieces of data is not less than a first preset value $N_{min}$; or when the average value $\overline{LQI}$ is greater than or equal to an upper threshold $LQI_{max}$, increase the quantity of pieces of data allowed to be transmitted in the next period, where the quantity of pieces of data is not greater than a second preset value $N_{max}$; or when the average value $\overline{LQI}$ is greater than a lower threshold $LQI_{min}$ and less than an upper threshold $LQI_{max}$, determine that the quantity of pieces of data allowed to be transmitted in the next period is the value N of the quantity of pieces of data allowed to be transmitted in the current period.

Specifically, the lower threshold $LQI_{min}$, the upper threshold $LQI_{max}$, the first preset value $N_{min}$, namely, a minimum value of a quantity of pieces of data allowed to be transmitted in one period, and the second preset value $N_{max}$, namely, a maximum value of a quantity of pieces of data allowed to be transmitted in one period are configured when the network is initialized. As shown in FIG. 3A and FIG. 3B, if the count value of the quantity of pieces of data is equal to the value N of the quantity of pieces of data allowed to be transmitted in the current period, that the processing module 102 calculates the average value $\overline{LQI}$ of the LQI of data received within the current period, and compares $\overline{LQI}$ with the threshold, so that the quantity of pieces of data allowed to be transmitted in the next period is adaptively adjusted specifically uses the following manner:

when the average value $\overline{LQI}$ is less than or equal to the lower threshold $LQI_{min}$, the quantity of data allowed to be transmitted in the next period is reduced, where the quantity of pieces of data is not less than the first preset value $N_{min}$; or when the average value $\overline{LQI}$ is greater than or equal to the upper threshold $LQI_{max}$, the quantity of data allowed to be transmitted in the next period is increased, where the quantity of pieces of data is not greater than the second preset value $N_{max}$; or when the average value $\overline{LQI}$ is greater than a lower threshold $LQI_{min}$ and less than an upper threshold $LQI_{max}$, it is determined that the quantity of pieces of data allowed to be transmitted in the next period is the value N of the quantity of pieces of data allowed to be transmitted in the current period.

As shown in FIG. 3A, FIG. 3B and FIG. 4, it is assumed that a quantity N of pieces of data allowed to be transmitted in a first period is equal to 5. After the receiving device receives data of the fourth frame in this period, no data is received within the preset length t for a timer timeout, and therefore the count value increases by 1. In this case, the count value n of the quantity of pieces of data is equal to 5, and the processing module 102 of the receiving device calculates the average value $\overline{LQI}$, and compares $\overline{LQI}$ with the lower threshold $LQI_{min}$ and the upper threshold $LQI_{max}$ separately. If $\overline{LQI}$ is less than or equal to $LQI_{min}$, it indicates that a channel is interfered, and channel quality is relatively poor. The quantity of pieces of data allowed to be transmitted in the next period is reduced and cannot be less than the first preset value $N_{min}$. For example, the quantity of pieces of data allowed to be transmitted in the next period is 4. After the quantity of pieces of data allowed to be transmitted in the next period is determined, the reply module 103 constructs a Pec-ACK frame and replies with the Pec-ACK frame for confirmation, and feeds back, by using the Pec-ACK frame, the quantity of pieces of data allowed to be transmitted in the next period to the source device. The source node then starts data transmission of the next period. In a second period, data of the fifth frame in the previous period needs to be retransmitted. When the retransmitted data is received, the reply module 103 immediately replies with an ACK frame for confirmation. When the quantity of pieces of received data is equal to the quantity of pieces of data allowed to be transmitted in the period, for example, 4; then, the processing module 102 calculates the average value $\overline{LQI}$, and compares $\overline{LQI}$ with the lower threshold $LQI_{min}$ and the upper threshold $LQI_{max}$ separately. If $\overline{LQI}$ is greater than or equal to $LQI_{max}$, it indicates that channel quality is relatively high. The quantity of pieces of data allowed to be transmitted in the next period is increased and cannot be greater than the second preset value $N_{max}$. For example, the quantity of pieces of data allowed to be transmitted in the next period is 6. As shown in FIG. 5, in a third period, when a result of comparing $\overline{LQI}$ of data received in this period with $LQI_{min}$ and $LQI_{max}$ is $LQI_{min} < \overline{LQI} < LQI_{max}$, a quantity of pieces of data allowed to be transmitted in a fourth period is a quantity of pieces of data allowed to be transmitted in the third period, for example, 6.

Optionally, the processing module 102 is further specifically configured to:

when the average value $\overline{LQI}$ is less than or equal to the lower threshold $LQI_{min}$, if $N*(1-k)$ is less than the first preset value $N_{min}$, determine that the quantity of pieces of data allowed to be transmitted in the next period is the first preset value $N_{min}$, or if $N*(1-k)$ is greater than or equal to the first preset value $N_{min}$, round $N*(1-k)$, where k is $(LQI_{min}-\overline{LQI})/LQI_{min}$.

Specifically, when the average value $\overline{LQI}$ is less than or equal to the lower threshold $LQI_{min}$, the quantity of pieces of data allowed to be transmitted in the next period is reduced, but cannot be less than the first preset value $N_{min}$, and may be a larger value between $N_{min}$ and a result of rounding $N*(1-k)$, where k is $(LQI_{min}-\overline{LQI})/LQI_{min}$.

Optionally, the processing module 102 is further specifically configured to:

when the average value $\overline{LQI}$ is greater than or equal to the upper threshold $LQI_{max}$, if $N*(1+k)$ is greater than the second preset value $N_{max}$, determine that the quantity of pieces of data allowed to be transmitted in the next period is the second preset value $N_{max}$, or if $N*(1+k)$ is less than or equal to the second preset value $N_{max}$, round $N*(1+k)$, where k is $(\overline{LQI}-LQI_{max})/LQI_{max}$.

Specifically, when the average value $\overline{LQI}$ is greater than or equal to the upper threshold $LQI_{max}$, the quantity of pieces of data allowed to be transmitted in the next period is increased, but cannot be greater than the second preset value $N_{max}$, and may be a smaller value between $N_{max}$ and a result of rounding $N*(1+k)$, where k is $(\overline{LQI}-LQI_{max})/LQI_{max}$.

A frame format of the Pec-ACK frame is shown in Table 1:

TABLE 1

Frame format of the Pec-ACK frame

| 4 bytes | 2 bytes | ... 2 bytes | 1 byte | 1 byte | 1 byte | 10 bytes |
|---|---|---|---|---|---|---|
| FCS | MPDU ID n | ... MPDU ID 1 | MPDUs confirmation | Quantity of pieces of data in a next period | Quantity of pieces of data in a current period | MAC frame header section |

In Table 1, MPDU refers to a MAC protocol data unit, and FCS refers to a frame check sequence. A format of a MAC frame header section is shown in Table 2:

TABLE 2

Format of a MAC frame header section

| 1 byte | 3 bytes | 1 byte | 1 byte | 2 bytes | 2 bytes |
|---|---|---|---|---|---|
| Flow indication | Data fragment control | Address of a source device | Address of a destination device | PNID | Frame control |

In Table 2, 0xFA is added to a flow indication to identify a video data flow, and PNID refers to a network identifier of a personal area network. A format of a frame control field is shown in Table 3, a periodicity acknowledgment frame Pec-ACK is added, and remaining fields are the same as those in the IEEE802.15.3 standard.

TABLE 3

Format of a frame control field

| b15 | b14 | b13 | b12 | b11 | b10 | b9 | b8-b7 | be | b5-b3 | b2-b0 |
|---|---|---|---|---|---|---|---|---|---|---|
| Pec-ACK | Blk-ACK | CTA abandon | Imp-ACK NACK | An Imp-ACK request | More data | Retry | An ACK mechanism | SEC | Frame type | Protocol version |

TABLE 4

Effective ACK mechanism field type value in frame control

| Pec-ACK field b15 | Blk-ACK field b14 | Imp-ACK request field b11 | ACK mechanism fields b8 and b7 | ACK mechanism type |
|---|---|---|---|---|
| 0 | 0 | 0 | 00 | No ACK |
| 0 | 0 | 0 | 01 | Imm-ACK |
| 0 | 0 | 0 | 10 | Dly-ACK |
| 0 | 0 | 0 | 11 | Dly-ACK request |
| 0 | 0 | 1 | 01 | Imp-ACK |
| 0 | 1 | 0 | 01 | Blk-ACK |
| 1 | 0 | 0 | 10 | Pec-ACK |

Table 4 shows an effective ACK mechanism field type value in frame control. For example, No ACK is no ACK reply, and bits 7, 8, 11, 14, and 15 of a frame control field are all set to 0; Imm-ACK is an immediate ACK reply; Dly-ACK is a delayed ACK reply; Imp-ACK is a system default ACK; Blk-ACK is an ACK of packet data.

In this embodiment, when an average value $\overline{LQI}$ is less than or equal to a lower threshold $LQI_{min}$, a quantity of pieces of data allowed to be transmitted in a next period is reduced, where the quantity of pieces of data is not less than a first preset value $N_{min}$; or when the average value $\overline{LQI}$ is greater than or equal to an upper threshold $LQI_{max}$, the quantity of pieces of data allowed to be transmitted in the next period is increased, where the quantity of pieces of data is not greater than a second preset value $N_{max}$; or when the average value $\overline{LQI}$ is greater than a lower threshold $LQI_{min}$ and less than an upper threshold $LQI_{max}$, is determined that the quantity of pieces of data allowed to be transmitted in the next period is a quantity N of pieces of data allowed to be transmitted in a current period. A real-time channel detection mechanism is formed by comparing and analyzing an average value of LQI and a threshold; the quantity of pieces of data allowed to be transmitted in the next period is adaptively adjusted to ensure data reliability; and by means of replying with a periodicity acknowledgment frame, exchanges of acknowledgment frames are reduced, which reduces overheads required for the exchanges of acknowledgment frames, reduces a waiting delay of data, improves network throughput and data sending and receiving efficiency, and meets a real-time requirement of multimedia data, especially, video data.

In the solution of this embodiment of the present invention, normal period rotation is performed after an exchange is completed according to a quantity, of pieces of data allowed to be transmitted in one period, agreed between a source device that sends data and a receiving device. During a data exchange, if a data loss case occurs, a count value of a quantity of pieces of data cannot be updated, an agreed quantity of pieces of data cannot be properly counted, and an average LQI value cannot be accurately obtained.

Therefore, a preset period of time t, namely a timeout interval of a timer, is set. If no data is received within the specified time t, it may be determined that data is lost, a count value of a quantity of pieces of data in the period is increased by 1, and the timer restarts timing.

According to the IEEE802.15.3 standard, when data is continuously sent, a time required for completing receiving of one frame of data is: T=Td+TMIFS. Td is an average time required for receiving one frame of data, and TMIFS is an average waiting time of minimum interframe spacing (Minimum Interframe Spacing, MIFS for short).

Because a time required for data frame transmission is effected by an environmental factor, a transmission time of some data frames is slightly greater than T; therefore, the preset time t may be set to t=Td+2×TMIFS.

Figure 6:
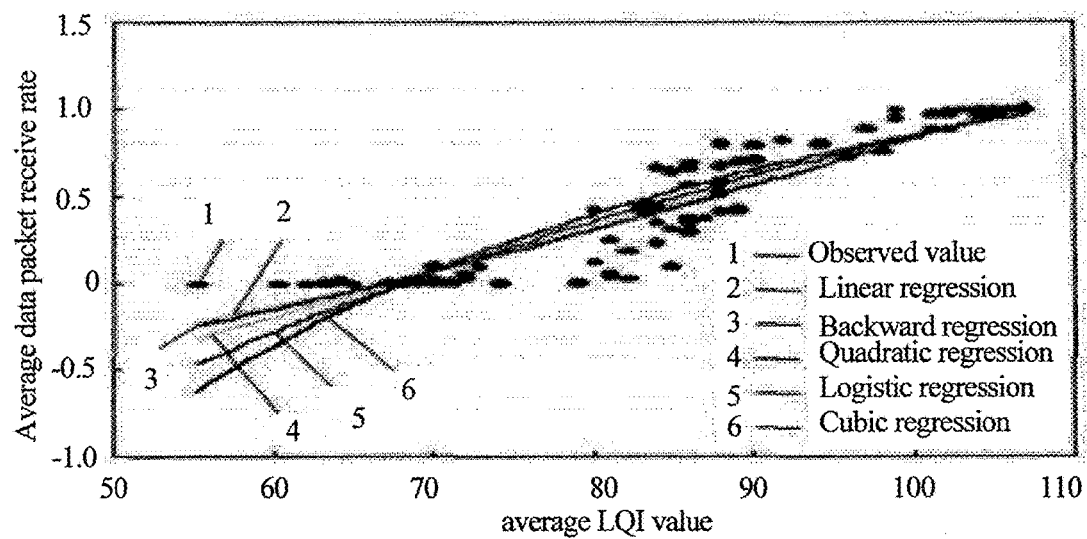
FIG. 6 is a schematic diagram of a relationship, between an average LQI value and an average data packet receiving rate, simulated on a MicaZ hardware platform.
Figure 7:
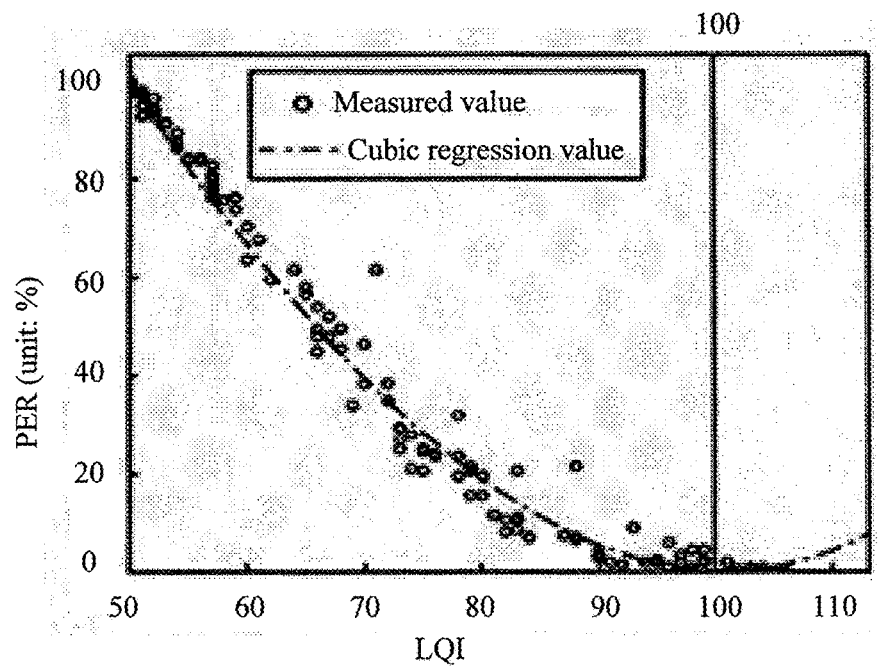
FIG. 7 is a schematic diagram of a relationship, between an LQI value and a packet error rate PER, simulated on a TelosB hardware platform.

FIG. 6 is a schematic diagram of a relationship, between an average LQI value and an average data packet receive rate, simulated on a MicaZ hardware platform; FIG. 7 is a schematic diagram of a relationship, between LQI and a packet error rate PER, simulated on a TelosB hardware platform. On the MicaZ platform, when $\overline{LQI}$ is less than 80, a data packet receive rate is 0; when $\overline{LQI}$ is greater than 105, the data packet receive rate is 1, and reliability is highest; when $100<\overline{LQI}<105$, the data packet receive rate is close to 1, and reliability is relatively high; when $\overline{LQI}$ is less than 100, the data packet receive rate progressively decreases, and smaller $\overline{LQI}$ indicates lower reliability.

On the TelosB platform, when LQI<50, the PER is 100%; when LQI>105, the PER is 0%, and reliability is very high; when 95<LQI<105, the PER is close to 0%, and reliability is relatively high; when LQI<95, the PER presents a trend of a linear increase, and lower LQI indicates lower reliability.

Therefore, on these two hardware platforms, a threshold interval in the solution of this embodiment may be set to [95,105] to meet a reliability requirement of video transmission, that is, a lower threshold $LQI_{min}$ is 95, and an upper threshold $LQI_{max}$ is 105.

On the MicaZ hardware platform, a preset link quality indication critical value may be set to 80; on the TelosB hardware platform, the preset link quality indication critical value may be set to 50.

Figure 8:
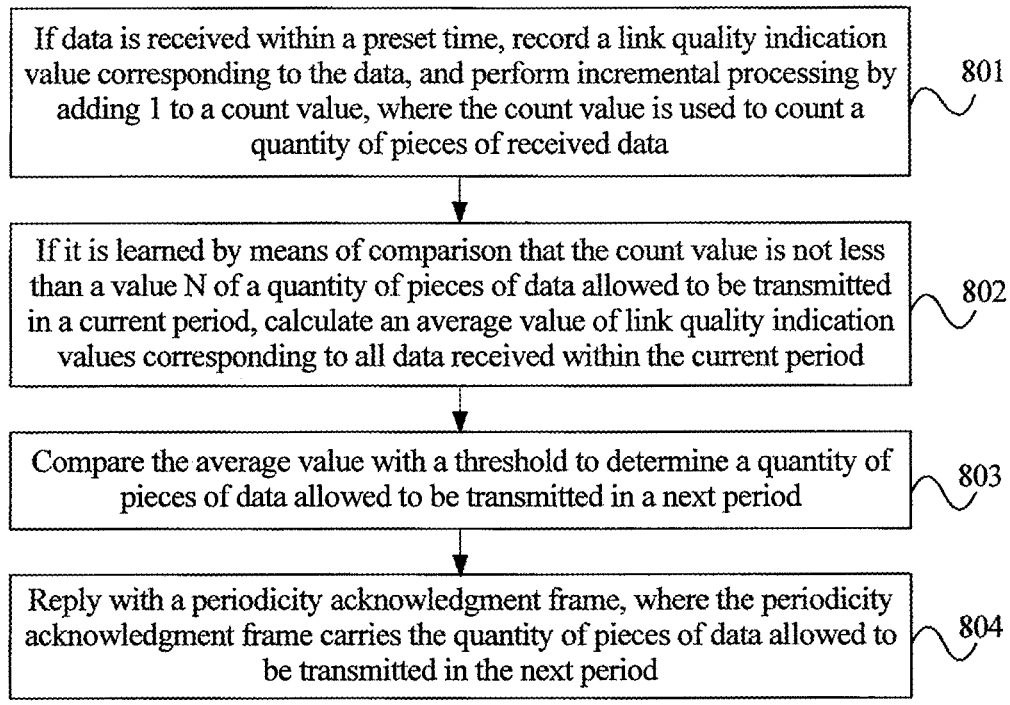
FIG. 8 is a flowchart of Embodiment 1 of a data transmission method according to the present invention.

FIG. 8 is a flowchart of Embodiment 1 of a data transmission method according to the present invention; this embodiment is executed by a data transmission apparatus, where the data transmission apparatus may be implemented by using software and/or hardware. The solution in this embodiment may be applied to a wireless multimedia sensor network. The data transmission apparatus may be a receiving device in the wireless multimedia sensor network. The method in this embodiment may include:

Step 801. If data is received within a preset period of time, record a link quality indication value LQI corresponding to the data, and perform incremental processing by adding 1 to a count value, where the count value is used to count a quantity of pieces of received data.

Step 802. If it is learned by means of comparison that the count value is not less than a quantity N of pieces of data allowed to be transmitted in a current period, calculate an average value $\overline{LQI}$ of link quality indication values corresponding to all data received within the current period.

Step 803. Compare the average value $\overline{LQI}$ with a threshold to determine a quantity of pieces of data allowed to be transmitted in a next period.

Step 804. Reply with a periodicity acknowledgment frame, where the periodicity acknowledgment frame carries the quantity of pieces of data allowed to be transmitted in the next period.

Optionally, in step 801, if the received data is retransmission data, an acknowledgment frame is immediately returned.

Optionally, the method in this embodiment may further include:

if no data is received within the preset time, which is considered that a piece of null data is received within the preset time, performing incremental processing by adding 1 to the count value, where a link quality indication value of the null data is a preset link quality indication critical value.

Optionally, the comparing the average value $\overline{LQI}$ with a threshold to determine a quantity of pieces of data allowed to be transmitted in a next period includes:

reducing, when the average value $\overline{LQI}$ is less than or equal to a lower threshold $LQI_{min}$, the quantity of pieces of data allowed to be transmitted in the next period, where the quantity of pieces of data is not less than a first preset value $N_{min}$; or increasing, when the average value $\overline{LQI}$ is greater than or equal to an upper threshold $LQI_{max}$, the quantity of pieces of data allowed to be transmitted in the next period, where the quantity of pieces of data is not greater than a second preset value $N_{max}$; or determining, when the average value $\overline{LQI}$ is greater than a lower threshold $LQI_{min}$ and less than an upper threshold $LQI_{max}$, that the quantity of pieces of data allowed to be transmitted in the next period is the value N of the quantity of pieces of data allowed to be transmitted in the current period.

Optionally, the reducing, when the average value $\overline{LQI}$ is less than or equal to a lower threshold $LQI_{min}$, the quantity of pieces of data allowed to be transmitted in the next period, where the quantity of pieces of data is not less than a first preset value $N_{min}$ includes:

when the average value $\overline{LQI}$ is less than or equal to the lower threshold $LQI_{min}$, if $N*(1-k)$ is less than the first preset value $N_{min}$, determining that the quantity of pieces of data allowed to be transmitted in the next period is the first preset value $N_{min}$, or if $N*(1-k)$ is greater than or equal to the first preset value $N_{min}$, rounding $N*(1-k)$, where k is $(LQI_{min}-\overline{LQI})/LQI_{min}$.

Optionally, the increasing, when the average value $\overline{LQI}$ is greater than or equal to an upper threshold $LQI_{max}$, the quantity of pieces of data allowed to be transmitted in the next period, where the quantity of pieces of data is not greater than a second preset value $N_{max}$ includes:

when the average value $\overline{LQI}$ is greater than or equal to the upper threshold $LQI_{max}$, if $N*(1+k)$ is greater than the second preset value $N_{max}$, determining that the quantity of pieces of data allowed to be transmitted in the next period is the second preset value $N_{max}$, or if $N*(1+k)$ is less than or equal to the second preset value $N_{max}$, rounding $N*(1+k)$, where k is $(\overline{LQI}-LQI_{max})/LQI_{max}$.

According to the method in this embodiment, a structure in any of data transmission apparatus embodiments may be used to implement the technical solution in this embodiment, and implementation principles and technical effects are similar, which are not described in detail herein again.

Figure 9:
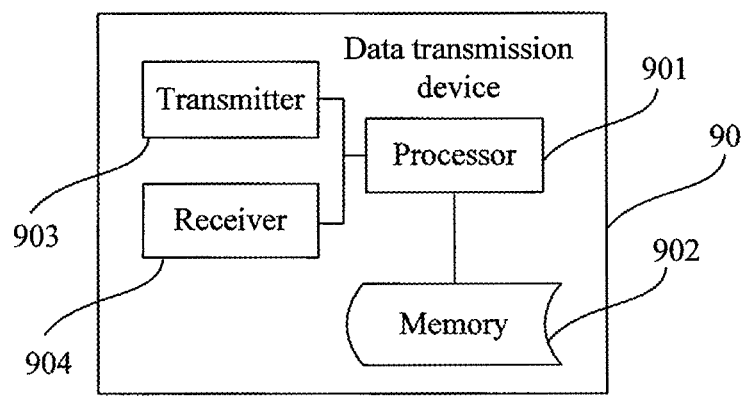
FIG. 9 is a schematic structural diagram of Embodiment 1 of a data transmission device according to the present invention.

FIG. 9 is a schematic structural diagram of Embodiment 1 of a data transmission device according to the present invention. As shown in FIG. 9, a data transmission device 90 provided in this embodiment includes a processor 901 and a memory 902. The data transmission device 90 may further include a transmitter 903 and a receiver 904. The transmitter 903 and the receiver 904 may be connected to the processor 901, where the transmitter 903 is configured to send data or information; the receiver 904 is configured to receive data or information; the memory 902 stores an execution instruction; when the data transmission device 90 runs, the processor 901 communicates with the memory 902, and the processor 901 invokes the execution instruction in the memory 902 to execute the technical solution of the method embodiment shown in FIG. 8, where implementation principles and technical effects thereof are similar, and are not described in detail herein again.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual requirements to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission apparatus, comprising:
a processor, configured to:
  record a link quality indication value LQI corresponding to received data and add 1 to a count value, when the data is received within a preset period of time, wherein the count value is used to count a quantity of pieces of received data,
  when it is learned by comparison that the count value is not less than a quantity N of pieces of data allowed to be transmitted in a current period, calculate an average value $\overline{LQI}$ of link quality indication values corresponding to all data received within the current period, and
  compare the average value $\overline{LQI}$ with a threshold to determine a quantity of pieces of data allowed to be transmitted in a next period; and
a transceiver, configured to reply with a periodicity acknowledgment frame that carries the quantity of pieces of data allowed to be transmitted in the next period, wherein the processor is configured to:
  when the average value $\overline{LQI}$ is less than or equal to a lower threshold $LQI_{min}$, reduce the quantity of pieces of data allowed to be transmitted in the next period, wherein the quantity of pieces of data is not less than a first preset value $N_{min}$, or
  when the average value $\overline{LQI}$ is greater than or equal to an upper threshold $LQI_{max}$, increase the quantity of pieces of data allowed to be transmitted in the next period, wherein the quantity of pieces of data is not greater than a second preset value $N_{max}$, or
  when the average value $\overline{LQI}$ is greater than a lower threshold $LQI_{min}$ and less than an upper threshold $LQI_{max}$, determine that the quantity of pieces of data allowed to be transmitted in the next period is the value N of the quantity of pieces of data allowed to be transmitted in the current period, and wherein
  when the average value $\overline{LQI}$ is less than or equal to the lower threshold $LQI_{min}$, when $N*(1-k)$ is less than the first preset value $N_{min}$, determine that the quantity of pieces of data allowed to be transmitted in the next period is the first preset value $N_{min}$, or when $N*(1-k)$ is greater than or equal to the first preset value $N_{min}$, round $N*(1-k)$, wherein k is $(LQI_{min}-\overline{LQI})/LQI_{min}$.

2. The apparatus according to claim 1, wherein the transceiver is further configured to:
when the received data is retransmission data, immediately reply with an acknowledgment frame.

3. The apparatus according to claim 1, wherein the processor is further configured to:
when no data is received within the preset time, which is considered that a piece of null data is received within the preset time, perform incremental processing by adding 1 to the count value, wherein a link quality indication value of the null data is a preset link quality indication critical value.

4. The apparatus according to claim 1, wherein the processor is further configured to:
when the average value $\overline{LQI}$ is greater than or equal to the upper threshold $LQI_{max}$, when $N*(1+k)$ is greater than the second preset value $N_{max}$, determine that the quantity of pieces of data allowed to be transmitted in the next period is the second preset value $N_{max}$, or when $N*(1+k)$ is less than or equal to the second preset value $N_{max}$, round $N*(1+k)$, wherein k is ($\overline{LQI}-LQI_{max})/LQI_{max}$.

5. A data transmission method, comprising:
recording a link quality indication value LQI corresponding to received data and add 1 to a count value, when the data is received within a preset period of time, wherein the count value is used to count a quantity of pieces of received data;
when it is learned by comparison that the count value is not less than a quantity N of pieces of data allowed to be transmitted in a current period, calculating an average value $\overline{LQI}$ of link quality indication values corresponding to all data received within the current period;

comparing the average value $\overline{LQI}$ with a threshold to determine a quantity of pieces of data allowed to be transmitted in a next period; and replying with a periodicity acknowledgment frame, wherein the periodicity acknowledgment frame carries the quantity of pieces of data allowed to be transmitted in the next period, wherein comparing the average value $\overline{LQI}$ with a threshold to determine a quantity of pieces of data allowed to be transmitted in a next period comprises:

reducing, when the average value $\overline{LQI}$ is less than or equal to a lower threshold $LQI_{min}$, the quantity of pieces of data allowed to be transmitted in the next period, wherein the quantity of pieces of data is not less than a first preset value $N_{min}$; or increasing, when the average value $\overline{LQI}$ is greater than or equal to an upper threshold $LQI_{max}$, the quantity of pieces of data allowed to be transmitted in the next period, wherein the quantity of pieces of data is not greater than a second preset value $N_{max}$; or determining, when the average value $\overline{LQI}$ is greater than a lower threshold $LQI_{min}$ and less than an upper threshold $LQI_{max}$, that the quantity of pieces of data allowed to be transmitted in the next period is the value N of the quantity of pieces of data allowed to be transmitted in the current period; and wherein reducing, when the average value $\overline{LQI}$ is less than or equal to a lower threshold $LQI_{min}$, the quantity of pieces of data allowed to be transmitted in the next period, wherein the quantity of pieces of data is not less than a first preset value $N_{min}$ comprises:

when the average value $\overline{LQI}$ is less than or equal to the lower threshold $LQ_{min}$, when $N*(1-k)$ is less than the first preset value $N_{min}$, determining that the quantity of pieces of data allowed to be transmitted in the next period is the first preset value $N_{min}$, or when $N*(1-k)$ is greater than or equal to the first preset value $N_{min}$, rounding $N*(1-k)$, wherein k is $(LQI_{min}-\overline{LQI})/LQI_{min}$.

6. The method according to claim 5, further comprising: when the received data is retransmission data, immediately replying with an acknowledgment frame.

7. The method according to claim 5, further comprising: when no data is received within the preset time, which is considered that a piece of null data is received within the preset time, performing incremental processing by adding 1 to the count value, wherein a link quality indication value of the null data is a preset link quality indication critical value.

8. The method according to claim 5, wherein increasing, when the average value $\overline{LQI}$ is greater than or equal to an upper threshold $LQI_{max}$, the quantity of pieces of data allowed to be transmitted in the next period, wherein the quantity of pieces of data is not greater than a second preset value $N_{max}$ comprises:

when the average value $\overline{LQI}$ is greater than or equal to the upper threshold $LQI_{max}$, when $N*(1+k)$ is greater than the second preset value $N_{max}$, determining that the quantity of pieces of data allowed to be transmitted in the next period is the second preset value $N_{max}$, or when $N*(1+k)$ is less than or equal to the second preset value $N_{max}$, rounding $N*(1+k)$, wherein k is $(\overline{LQI}-LQI_{max})/LQI_{max}$.

* * * * *